M. ROSEBOURNE AND F. A. COUSE.
AUTOMATIC PROTECTIVE GEAR FOR ELECTRICAL SYSTEMS.
APPLICATION FILED NOV. 3, 1916.

1,329,255.

Patented Jan. 27, 1920.
4 SHEETS—SHEET 1.

WITNESSES:
R. J. Ridge.
Geo. W. Hansen.

INVENTORS
Mostyn Rosebourne &
Frederick A. Couse.
BY
Wesley G. Carr
ATTORNEY

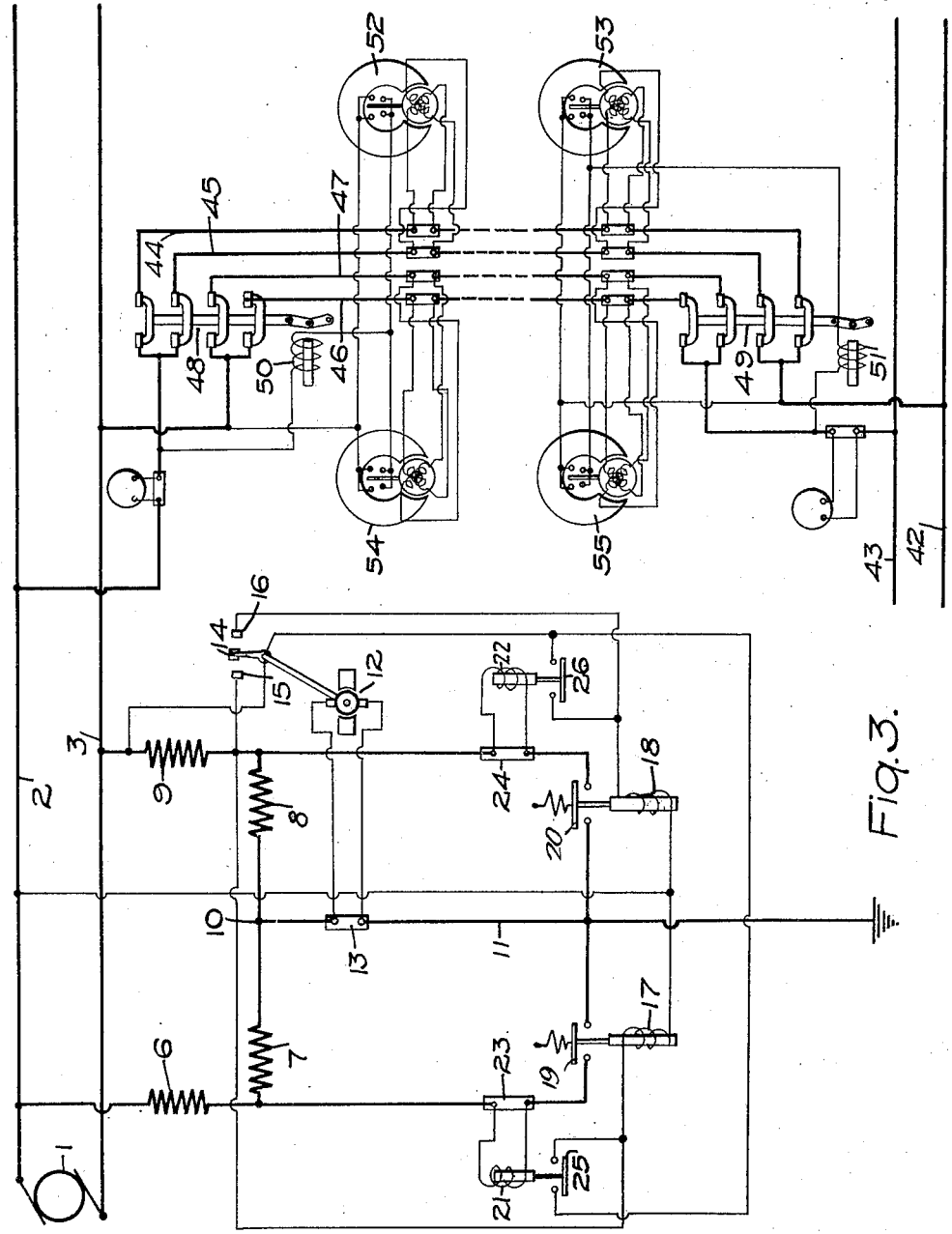

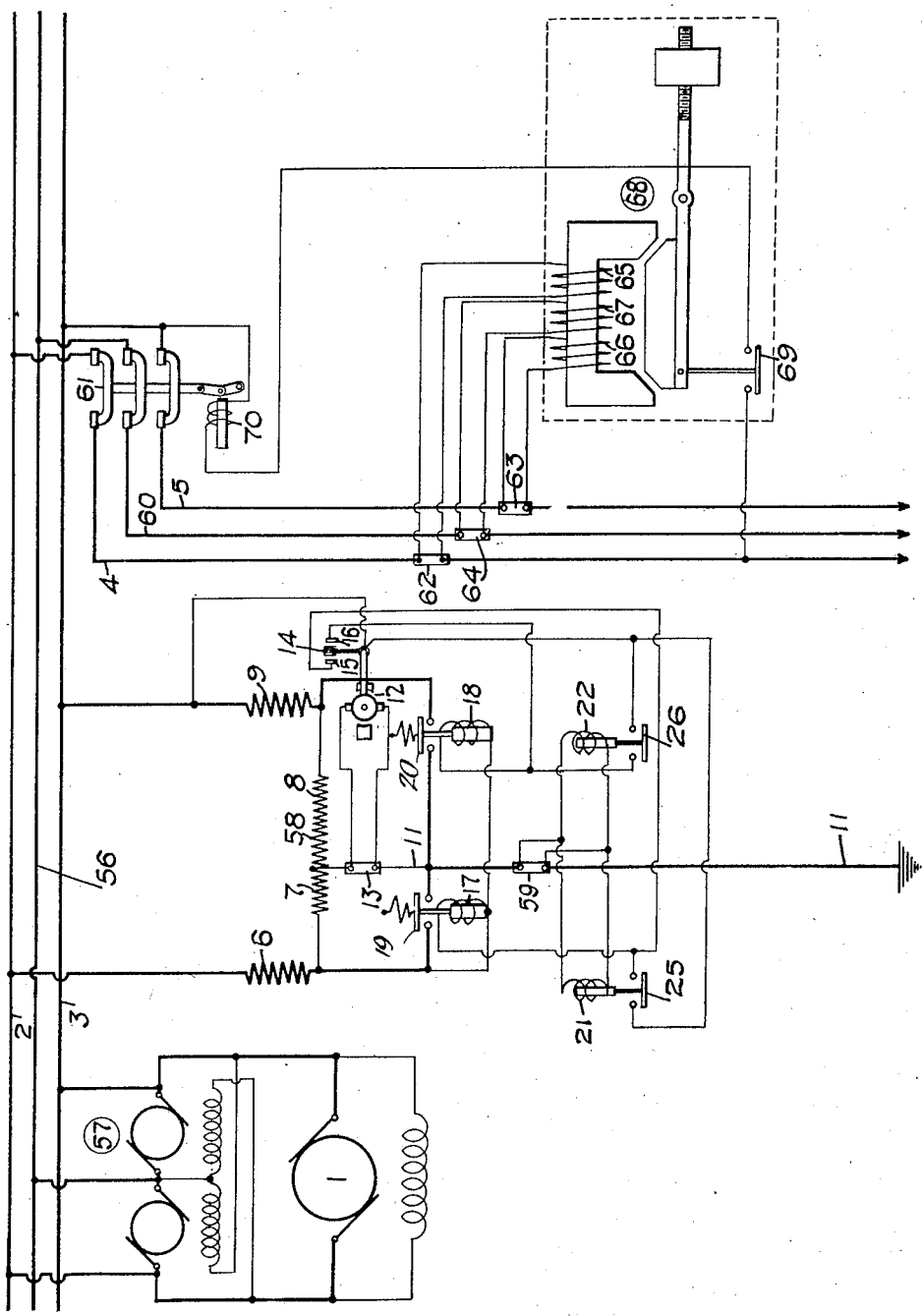

UNITED STATES PATENT OFFICE.

MOSTYN ROSEBOURNE, OF MANCHESTER, AND FREDERICK ARTHUR COUSE, OF URMSTON, ENGLAND, ASSIGNORS TO WESTINGHOUSE ELECTRIC AND MANUFACTURING COMPANY, A CORPORATION OF PENNSYLVANIA.

AUTOMATIC PROTECTIVE GEAR FOR ELECTRICAL SYSTEMS.

1,329,255.  Specification of Letters Patent.  Patented Jan. 27, 1920.

Application filed November 3, 1916. Serial No. 129,273.

*To all whom it may concern:*

Be it known that we, MOSTYN ROSEBOURNE, a subject of the King of England, and a resident of Manchester, in the county of Lancaster, England, and FREDERICK A. COUSE, a subject of the King of England, and a resident of Urmston, in the county of Lancaster, England, have invented a new and useful Improvement in Automatic Protective Gears for Electrical Systems, of which the following is a specification.

Our invention relates to protective devices for electric circuits and it has special relation to arrangements for protecting electrical distributing systems which may be subjected to grounds and the like that serve to impress serious disturbances on the system.

According to our present invention, the bus-bars of the system are connected together through resistors, an intermediate point thereof being connected to ground through a conductor and serving as a neutral point of the system. A switch or relay is provided which, when a fault to earth occurs on any of the conductors of the system, will be operated by the current flowing in the aforesaid earth-conductor to short-circuit a portion of said resistors so that the grounded conductor is no longer connected to a neutral point in the system. This results in unbalancing the currents in the feeders to such a degree, by reason of the increased current flowing through the fault, that a differential relay associated with said feeders will close the circuit through a trip coil of a circuit-breaker which, in turn, disconnects the feeder on which the fault has occurred.

In place of short-circuiting a part of the resistors, the switch or relay may operate to shift the point of connection to earth from the intermediate neutral point on the resistors to a point nearer the bus-bar having a polarity opposite to that of the conductor on which the fault has developed, thereby reducing the resistance of the path of the earth current.

Figure 1:
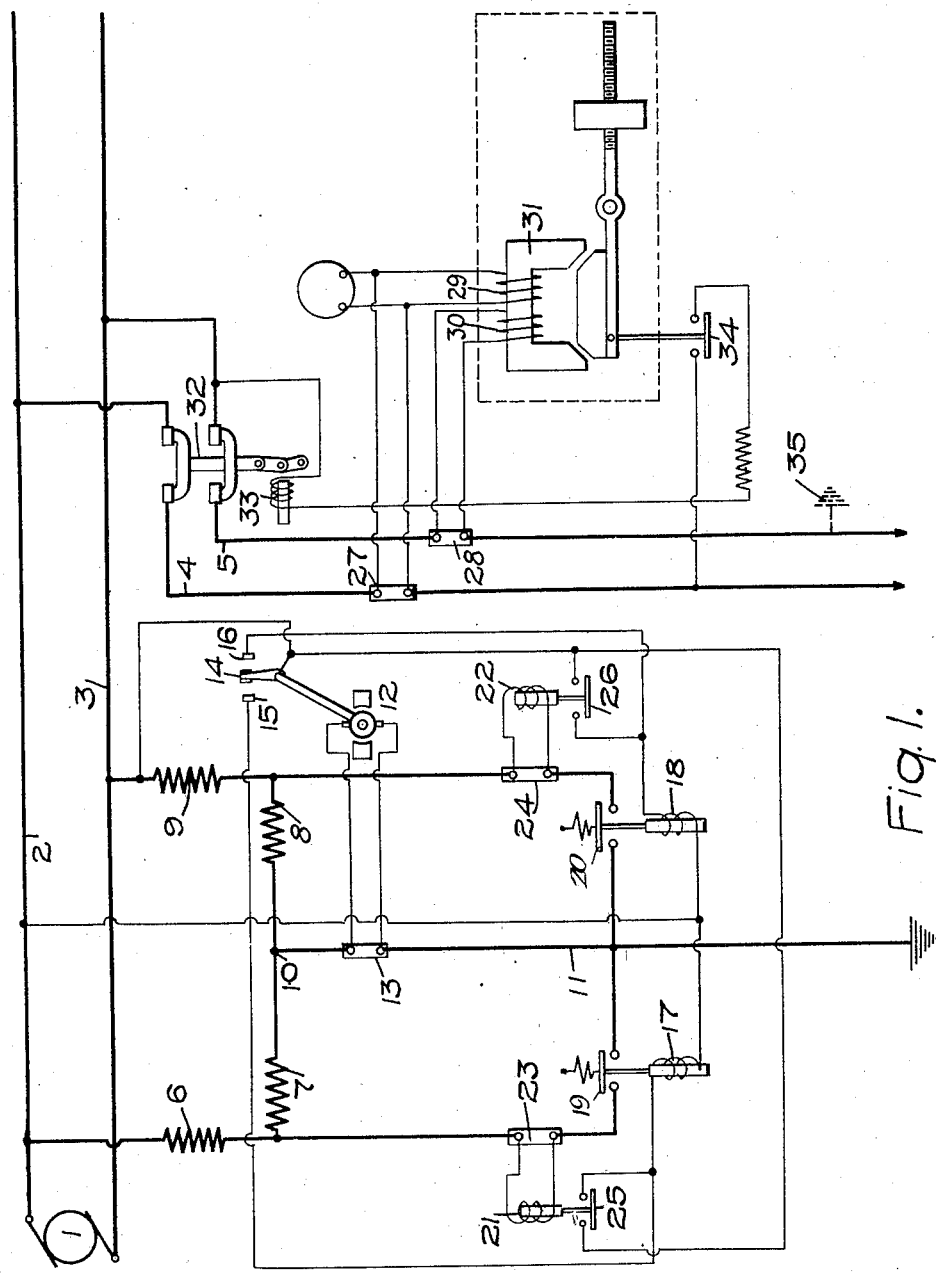
Figure 2:
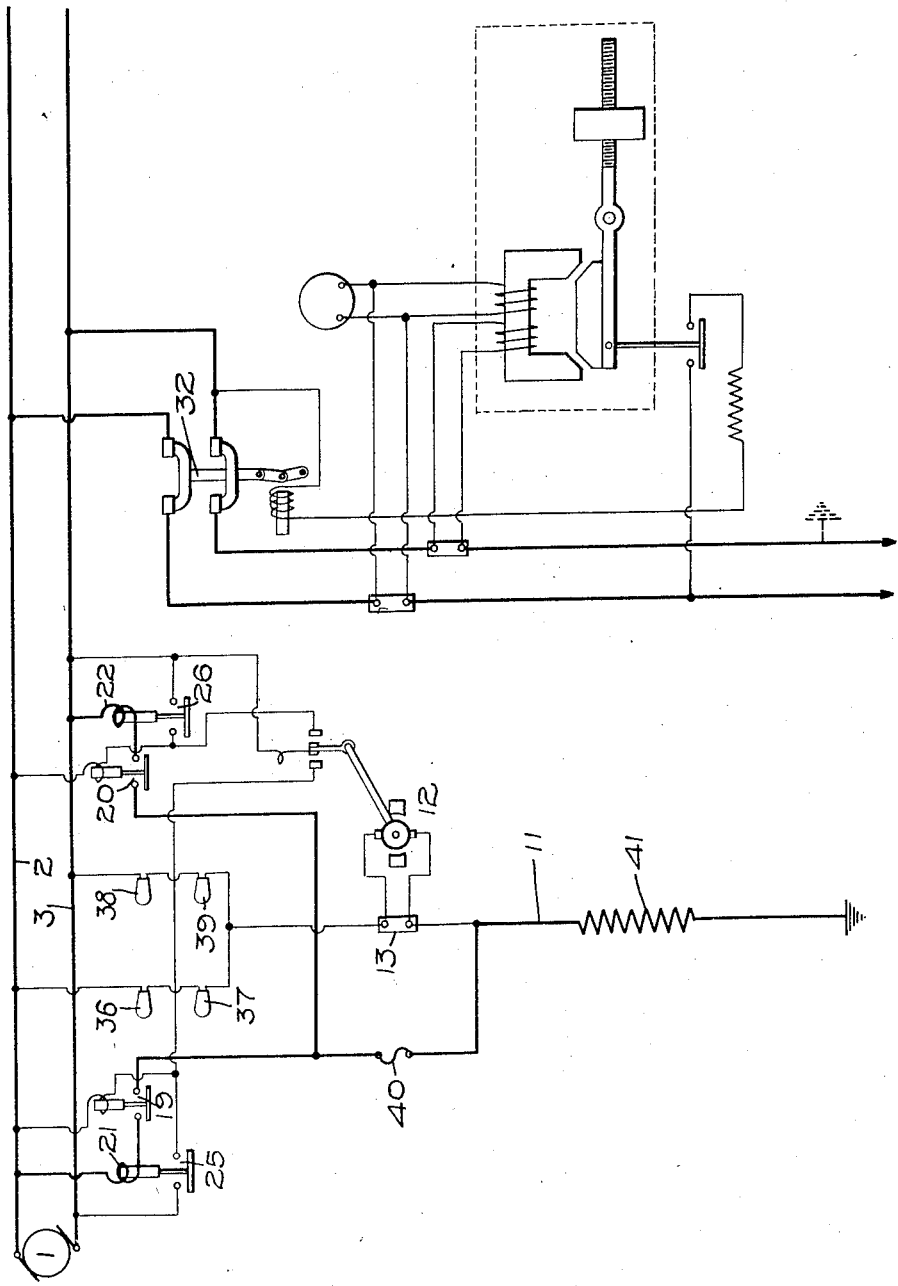

To more fully understand our invention, reference may be had to the following description and the accompanying drawings in which Figure 1 is a diagram of an electrical system embodying a form of our invention; Fig. 2 is a modified form of the system of Fig. 1; Fig. 3 is a diagrammatic view of a three-wire system associated with protective means built in accordance with our invention, and Fig. 4 is a diagram showing our invention applied to an electrical distributing system of a common form.

Referring to Fig. 1, which shows our invention applied to a two-wire system, a direct-current generator 1 is shown as supplying current to bus-bars 2 and 3, which are connected to the loads through feeders, one pair of which comprises conductors 4 and 5. The bus-bars 2 and 3 are connected through resistors 6, 7, 8 and 9 which, in the aggregate, have a comparatively high electrical resistance. The middle or neutral point 10 thereof is connected to ground through a conductor 11. A relay 12, an operating element of which is connected to the terminals of a shunt element 13 inserted in the conductor 11, is adapted to establish a connection between a terminal 14 connected to the bus-bar 3 and the one or the other of the terminals 15 and 16, according to the direction of the current flowing in the conductor 11. Connected between the terminals 15 and 16 and the bus-bar 2, are coils 17 and 18 which actuate contactor switches 19 and 20, respectively, that are adapted, when closed, to short circuit the resistors 7 and 8, respectively. Coils 21 and 22 are connected to the terminals of shunt elements 23 and 24 that, in turn, are inserted in series with the switches 19 and 20, respectively. The coils 21 and 22 serve to actuate auxiliary switches 25 and 26 which, when closed, short circuit the terminals 14—15 and 14—16, respectively, so as to avoid sparking at the contacts of the relay 12.

In series with the feeders 4 and 5 are shunt elements 27 and 28, respectively, to the terminals of which are connected coils 29 and 30 of a differential relay 31. A double-pole circuit breaker 32 is provided with an operating coil 33 which has its circuit controlled by a switch 34 that is closed by the relay 31 when unbalanced currents circulate in the coils 29 and 30, that is to say, through the feeders 4 and 5. Each pair of feeders to be protected is provided with apparatus similar to that just described in connection with the feeders 4 and 5.

The operation of our protective system is as follows: If a fault occurs whereby a conductor of the system is grounded, as shown, for example, by a fault 35 on the feeder 5, a current will flow in the earth conductor 11 from the bus-bar 2. This current will operate the relay 12 to connect the terminals 14 and 15 to each other so that a current will be caused to flow in the circuit comprising the actuating coil 17. In consequence thereof, the switch 19 operates to short circuit the resistor 7. The resistance between the bus-bar 2 and ground will be diminished and, consequently, the current flowing through the feeder 5 will become greater than that flowing through the feeder 4. The currents in the coils 29 and 30 will, therefore, become sufficiently unbalanced to operate the differential relay 31. This relay closes a switch 34, and the current which will then flow in the trip coil 33 actuates the double-pole circuit breaker 32 to interrupt the circuit through both feeders 4 and 5.

The switch 19, in closing, short circuits the shunt element 13 and the actuating element of the relay 12, as well as the resistor 7. Consequently, the operating element of the relay 12 will be deënergized and the relay contact members will be disconnected. No sparking, however, will occur at these contacts as they have already been short-circuited by the auxiliary switch 25, actuated by the current flowing in the coil 21 when the switch 19 is closed. The short-circuiting of the relay element 12 in this manner will prevent it from being damaged by the heavy current which traverses the conductor 11 when the resistor 7 is short-circuited.

If a ground occurs on the feeder 4 or on conductors directly connected thereto, the switch 20 will be closed, as may be readily apparent without further description.

In some cases, instead of two switches, such as 19 and 20, a single double-pole switch may be provided with a single operating coil connected to both contact members 15 and 16 of the relay 12, so that both the resistors 7 and 8 may be short-circuited when a current flows through the shunt 13 and the conductor 11.

Referring now to Fig. 2, the resistors 7 and 8 of Fig. 1 are replaced by lamps 36, 37, 38 and 39. Also, included in the earth conductor 11 is a time-limit fuse or relay 40 and a resistor 41, the latter replacing the resistors 6 and 9 of Fig. 1. The switches and operating coils and other parts are similar to corresponding parts described in Fig. 1, the operating coils 21 and 22 for the auxiliary switches 25 and 26, respectively, being, however, directly included in circuit with the switches 19 and 20. The operation of the arrangement is substantially the same as that described with reference to Fig. 1, but, when the one or the other of the pairs of lamps 36—37 and 38—39 is short-circuited, the lamps will be extinguished, and a visual indication be thus given when a fault occurs. If a fault occurs on the feeder side of the device, the opening of the feeder circuit breaker 32 will reduce the current flowing in the conductor 11 and through the fuse or time-limit relay 40, the time-limit or time-lag of the fuse or relay being arranged so that the feeder circuit breaker 32 will open before the fuse blows or the time-limit relay operates. If a fault occurs on the generator side of the device, the apparatus will operate in a similar manner, but, as circuit breakers for the generator are not intended to be automatically opened, a heavy current will continue to flow in the conductor 11 until the fuse or time-limit relay 40 operates to break this circuit. This action of the fuse 40 is called to the attention of the attendant by reason of the extinction of the one or the other pair of indicating lamps on the occurrence of a fault.

The arrangements hitherto described may be applied to alternating-current circuits, in which case the resistors may be replaced by equivalent reactors and the relay 12 be so designed as to be suitably operated by alternating currents.

Fig. 3 is a diagram of a system comprising the left-hand portion of the system of Fig. 1 in connection with a split-conductor system having a feeder arranged to be supplied from both ends, as in a ring system. The bus-bars are indicated at 2—3 and 42—43, and the feeders, which are supplied from the bus-bars 2 and 42, and 3 and 43, respectively, are arranged with split conductors 44—45 and 46—47, respectively. Double-pole circuit breakers 48 and 49 are provided at each end of the feeders with trip coils 50 and 51 and differential relays 52, 53, 54 and 55. These relays have their actuating coils connected to suitable shunt elements in the split conductors, as shown, and are adapted to close the circuit through the trip coils 50 and 51 and thereby actuate the circuit breakers 48 and 49 if unbalancing of the currents occurs in the two conductors 46 and 47, for example, which, in conjunction, form a split conductor. Apparatus such as described in Fig. 1 is provided in accordance with the present invention and connected to either pair of bus-bars; in this instance, to the bus-bars 2 and 3.

It will be readily understood that, if a fault or ground occurs on either of the conductors forming a split-conductor or if unequal faults occur on the two parts of a conductor, a portion of the resistance in series with the earth conductor 11 will be cut out by the operation of the relay 12, as hereinbefore described. At the same time, the currents flowing in the two parts of the split conductor on which the fault occurs will be unbalanced to such an extent as to cause the operation of the corresponding relays 52—53 or 54—55 to close the circuits of the trip coils 50 and 51. The trip coils, on being excited, operate the circuit breakers 48 or 49 to disconnect the pair of feeders in which the faulty conductor occurs without interfering with the remaining portion of the system.

Fig. 4 is a diagram somewhat similar to Fig. 1, illustrating our invention as applied to a three-wire direct-current system, the middle conductor 56 of which is connected to a neutral point of a balancer set 57 in the usual manner. The apparatus illustrated in the central portion of the diagram is similar to that shown in Figs. 1 and 3, corresponding parts being indicated by similar reference numerals. The resistors 7 and 8, however, are not of equal value, that is, the earth conductor 11 is not connected to the middle or neutral point of the combined resistors 7 and 8 which is indicated at 58, but is unsymmetrically connected thereto for a purpose hereinafter explained. The holding-in coils 21 and 22 of the auxiliary switches 25 and 26, in place of being connected to separate shunt elements placed in the circuits of the contactors 19 and 20, respectively, as in Fig. 1, are connected to the terminals of a common shunt element 59 in the conductor 11.

The three feeders are indicated at 4, 5 and 60, and are provided with a triple-pole circuit breaker 61 and shunt elements 62, 63 and 64, respectively, the terminals of which are connected to three coils 65, 66, and 67, of a relay 68, that, in turn, controls a switch 69 connected in circuit with a trip coil 70 of the circuit breaker 61.

The operation of the arrangement is similar to that described with reference to Fig. 1. The currents in the three coils 65, 66 and 67 of the relay 68 are normally balanced, and, if a fault occurs on any of the three wires of a feeder, a current will flow in the earth conductor 11 and in the resistor 7 or the resistor 8, as the case may be, will be short-circuited, resulting in an increase in the current-flow through the earth conductor 11. This momentary increase in the earth current creates an unbalanced condition in the currents traversing the three feeders 4, 5 and 60, so that the differential relay 68 will close the switch 69. On thus energizing the trip coil 70, the circuit breaker 61 will be operated to disconnect the feeders 4, 5 and 60 from the circuit. The resistors 7 and 8 are made unequal so that the potential of the point to which the earth conductor 11 is connected will not be the same as that of the neutral or middle wire 56. Consequently, a current will flow in the earth conductor 11 when a fault occurs on the middle conductor 60 of the feeder circuit.

While we have shown and described, in detail, several embodiments of our invention, it will be understood that many modifications may be made therein without departing from the spirit and scope of the appended claims.

We claim as our invention:

1. An electrical system of distribution comprising a conductor connected to a neutral point thereof and to ground, feeder conductors, a circuit interrupter inserted therein, a differential relay controlled by the currents traversing the feeder conductors and adapted to actuate said circuit interrupter, and means to operate said relay when current traverses said conductor extending between the neutral point of the system and ground, whereby the feeder conductors may be disconnected from circuit by the operation of the circuit interrupter.

2. An electrical system of distribution comprising a conductor connected to a neutral point thereof and to ground, feeder conductors, a circuit interrupter inserted therein, a differential relay controlled by the currents traversing the feeder conductors and adapted to actuate said circuit interrupter, and means for augmenting the unbalancing currents traversing said feeder conductors and thereby actuating said relay when ground currents traverse said conductor connected between the neutral point of the system and ground.

3. An electrical system of distribution comprising a conductor connected to a neutral point thereof and to ground, feeder conductors, a circuit interrupter inserted therein, means for actuating said circuit interrupter when unbalanced currents traverse said feeder conductors, and means for augmenting the value of the unbalanced currents obtaining in said feeder conductors when ground currents traverse said conductor connected to the neutral point of the system and to ground.

4. An electrical system of distribution comprising distributing means, current-limiting devices connected therebetween, a conductor extending between ground and an intermediate point on said current-limiting devices, feeder conductors connected to said means, means for disconnecting said feeder conductors from said mains when the currents traversing the feeder conductors become unbalanced, and means for short-circuiting the current-limiting devices when currents traverse the ground connection to augment the unbalancing of the currents traversing the feeder conductors.

5. An electrical system of distribution comprising a conductor connected to a neutral point thereof and to ground, feeder conductors, circuit interrupters inserted therein, means for augmenting the unbalancing of the system when currents traverse the conductor that is connected between the neutral point and ground, and means operated by the augmented unbalancing conditions obtaining on said system to actuate said circuit interrupter.

6. An electrical system comprising mains, current-limiting elements connected therebetween, a conductor connected between an intermediate point of said current-limiting elements and ground, and feeder conductors connected to the mains, a circuit interrupter inserted therein, means for shunting a portion of said current-limiting elements when ground currents traverse said ground connection whereby the unbalancing of the system is augmented, and means operative when the augmented unbalancing conditions obtain for actuating said circuit interrupter.

In testimony whereof, we have hereunto subscribed our names this fourteenth day of October, 1916.

MOSTYN ROSEBOURNE.
FREDERICK ARTHUR COUSE.

Witnesses:
G. HARLOW,
W. W. WADMORE.